United States Patent
Ron et al.

(10) Patent No.: US 12,487,742 B2
(45) Date of Patent: Dec. 2, 2025

(54) TOUCH CLASSIFIER SYSTEM USING CONTEXT DATA

(71) Applicant: Microsoft Technology Licensing, LLC, Redmond, WA (US)

(72) Inventors: Uri Ron, Kfar Saba (IL); Shoham Dekel, Tel Aviv (IL); Gilad Pundak, Rehovot (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/191,725

(22) Filed: Mar. 28, 2023

(65) Prior Publication Data
US 2024/0329825 A1 Oct. 3, 2024

(51) Int. Cl.
*G06F 3/048* (2013.01)
*G06F 3/0346* (2013.01)
*G06F 3/0354* (2013.01)
*G06F 3/044* (2006.01)
*G06F 3/0488* (2022.01)

(52) U.S. Cl.
CPC .......... *G06F 3/0488* (2013.01); *G06F 3/0346* (2013.01); *G06F 3/03545* (2013.01); *G06F 3/0446* (2019.05)

(58) Field of Classification Search
CPC .. G06F 3/0488; G06F 3/0346; G06F 3/03545; G06F 3/0446
See application file for complete search history.

(56) References Cited

U.S. PATENT DOCUMENTS

| | | | |
|---|---|---|---|
| 2011/0037727 A1* | 2/2011 | Lee ...................... | G06F 3/04166 345/174 |
| 2011/0209097 A1* | 8/2011 | Hinckley ............ | G06F 3/04883 715/863 |
| 2011/0242032 A1 | 10/2011 | Seo | |
| 2013/0027303 A1 | 1/2013 | Bernstein | |
| 2013/0328788 A1 | 12/2013 | Wibbeler | |
| 2014/0118268 A1* | 5/2014 | Kuscher ................ | G06F 3/0488 345/173 |

(Continued)

FOREIGN PATENT DOCUMENTS

CN 110531894 A 12/2019

OTHER PUBLICATIONS

International Search Report and Written Opinion received for PCT Application No. PCT/US2024/019326, mailed on Jun. 28, 2024, 16 pages.

*Primary Examiner* — Aleksey Olshannikov
(74) *Attorney, Agent, or Firm* — Alleman Hall & Tuttle LLP

(57) ABSTRACT

A method to provide classified touch data to a computer program executing on a device comprises: (a) assembling a map of touch signal from a touch sensor arranged on an electronic display and including a plurality of crossings of row and column electrodes, the map including a corresponding touch-signal value for each of the plurality of crossings, and defining at least one touched region of the touch sensor; (b) serving context data relating to user-interface content currently presented on the electronic display; (c) computing classified touch data corresponding to the map of touch signal, based at least partly on the map and the context data; and (d) providing the classified touch data to an operating system of the device.

20 Claims, 10 Drawing Sheets

(56) References Cited

U.S. PATENT DOCUMENTS

| | | |
|---|---|---|
| 2016/0077616 A1 | 3/2016 | Durojaiye et al. |
| 2016/0077663 A1 | 3/2016 | Durojaiye et al. |
| 2017/0052625 A1* | 2/2017 | Bryant ................ G06F 3/04883 |
| 2017/0123590 A1* | 5/2017 | Han .................... G06F 3/04166 |
| 2017/0300170 A1 | 10/2017 | Hinckley et al. |
| 2018/0088786 A1 | 3/2018 | Abzarian |
| 2018/0121052 A1 | 5/2018 | Durojaiye et al. |
| 2019/0114021 A1* | 4/2019 | Oliver .................... G06F 3/048 |
| 2019/0258353 A1 | 8/2019 | Drumm et al. |
| 2020/0064960 A1 | 2/2020 | Munemoto |
| 2022/0050577 A1 | 2/2022 | Birenberg et al. |

\* cited by examiner

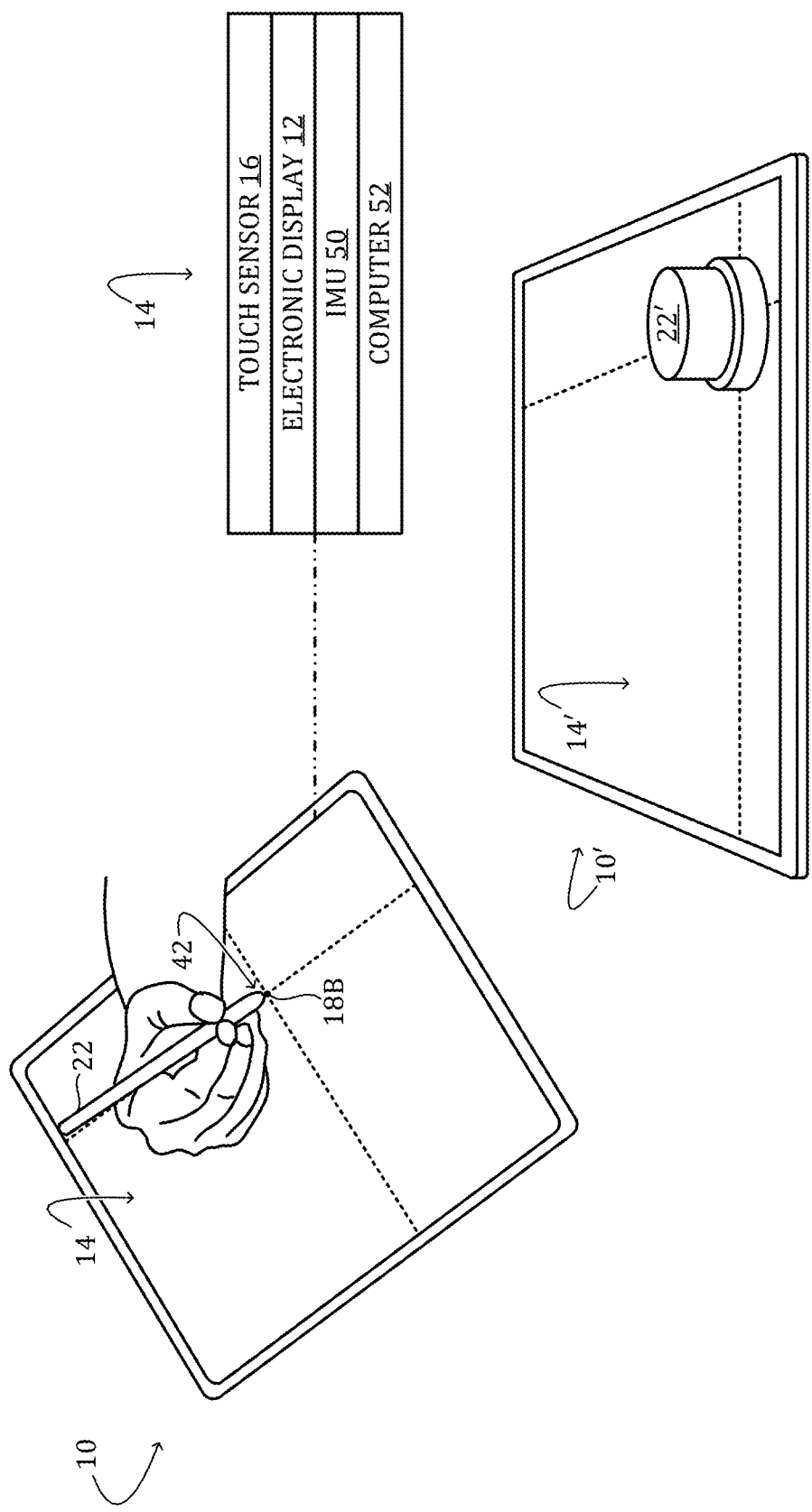

TOUCH CLASSIFIER SYSTEM USING CONTEXT DATA

BACKGROUND

A capacitive touch sensor is an input component of various kinds of electronic devices. In some devices a capacitive touch sensor comprises optically transparent material patterned above or integrated within a display panel. Common in laptop and tablet computers, smartphones, and game systems, the touch-screen display configuration offers combined touch-input and display functionality.

SUMMARY

One aspect of this disclosure relates to a device comprising an electronic display, a touch sensor arranged on the electronic display and including a plurality of crossings of row and column electrodes, and operatively coupled touch-sensor logic, a context engine, and a touch-classifier system. The touch-sensor logic is configured to assemble a map of touch signal from the touch sensor, the map including a corresponding touch-signal value for each of the plurality of crossings, and defining at least one touched region of the touch sensor. The context engine is configured to gather and serve context data relating to user-interface content currently presented on the electronic display. The touch-classifier system is configured to compute classified touch data corresponding to the map of touch signal, based at least partly on the map and the context data, and to provide the classified touch data to an operating system of the device.

Another aspect of this disclosure relates to a method to provide classified touch data to a computer program executing on a device with an integrated electronic display. The method comprises: (a) assembling a map of touch signal from a touch sensor arranged on the electronic display and including a plurality of crossings of row and column electrodes, the map including a corresponding touch-signal value for each of the plurality of crossings, and defining at least one touched region of the touch sensor; (b) serving context data relating to user-interface content currently presented on the electronic display; (c) computing classified touch data corresponding to the map of touch signal based at least partly on the map and the context data; and (d) providing the classified touch data to an operating system of the device.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

BRIEF DESCRIPTION OF THE DRAWINGS

FIG. 1B shows aspects of two example handheld devices, each having a touch sensor arranged on an electronic display.

DETAILED DESCRIPTION

In many scenarios a touch-screen display device may be handled in ways that encourage false or inadvertent touch events, which, if processed as input, may degrade the user experience. This issue can be particularly troublesome in relatively small, handheld devices with little or no non-functional bezel—i.e., where touch sensing extends all the way to the edge of the device, and where the user may grip the edge during normal operation. Many touch-screen device users are familiar with the experience where gripping touch from the thumb or palm is mistaken for valid touch input, resulting in closure of an active application, unintended scrolling, etc. Some useful remedies for this problem seek to distinguish the geometric signature of a fingertip (as opposed to another part of the hand) in the map of touch signal from the touch sensor, to thereby discriminate valid from invalid touch. That approach can be difficult to enact, however, especially when the signal is relatively noisy. Excessive noise may be observed in 'floating ground' operation, for example, where the device is neither connected to AC power nor held in the user's bare hand.

This disclosure offers a robust solution to address the issues above and to provide further advantages. Broadly speaking, the disclosed method harvests certain context data from the operating system of the device and provides that data, along with an (X, Y) map of the touch signal, to a touch-classifier system executing on one or more processing levels on the device. The touch-classifier system determines which touch regions are valid or not and reports that information to the OS. The context data can comprise data of various kinds, such as device orientation, user handedness, etc. One of the most important features of the context data is the layout of user-interface elements presented on the display screen at any given time. Such layout includes the positions and dimensions of the various icons and other markers, against which any touched region identified via the map can be compared by the touch-classifier system. Relative to existing approaches, the solutions herein reduce false positives for valid touch detection. They also reduce both latency and power consumption for detecting valid touch, by rejecting invalid touch events earlier in the processing pipeline.

Figure 1A:
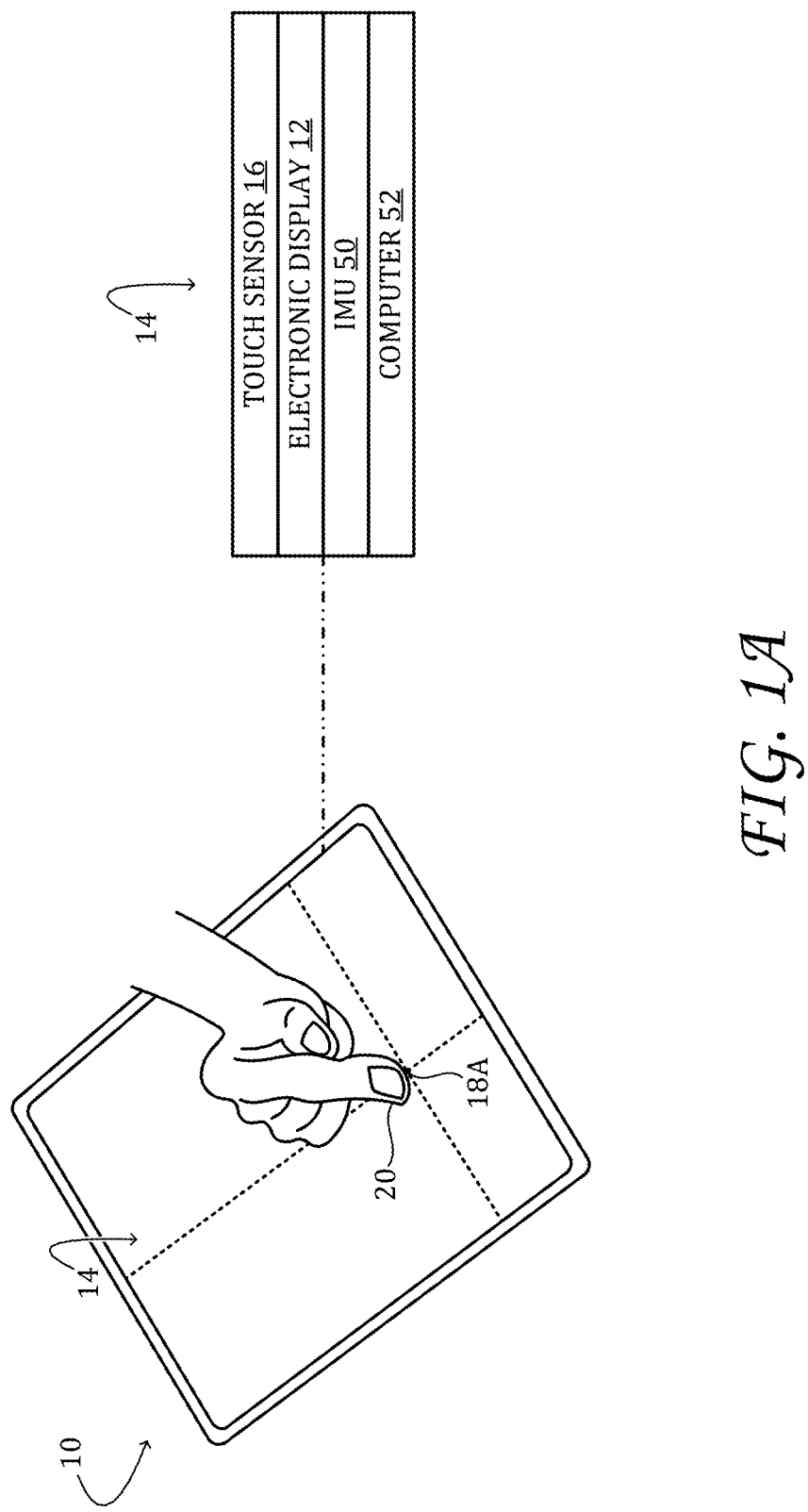
FIG. 1A shows aspects of an example handheld device having a touch sensor arranged on an electronic display.

Turning now to the drawings, FIG. 1A shows aspects of an example handheld device 10 having an electronic display 12. Some devices consonant with this disclosure include laptop and tablet computers, smartphones, and handheld game systems. Other examples include touch-screen displays installed in automobiles or kiosks, and virtually any other kind of touch-screen display device. While the size, function, and form factor of the device are not particularly limited, some aspects of the solutions herein apply especially to handheld devices, which a user may grip in such a way that the hand or fingers touch the front surface 14 of the device. In some examples, electronic display 12 is a liquid-crystal display (LCD). In some examples the electronic display is a light-emitting diode (LED) display, such as active-matrix organic LED (AMOLED) or quantum LED (QLED) display. Electronic displays of other kinds are also envisaged.

Device 10 includes a capacitive touch sensor 16 arranged on top of electronic display 12, on front surface 14. The touch sensor is configured to acquire touch signal responsive to touch from the user's finger or pen on the front surface, and thereby locate at least one touchpoint effected by the user. Touchpoint 18A is the point of contact between the user's fingertip 20 and front surface 14. Touchpoint 18B of FIG. 1B is the point of contact between the user's pen 22 and the front surface.

Figure 2:
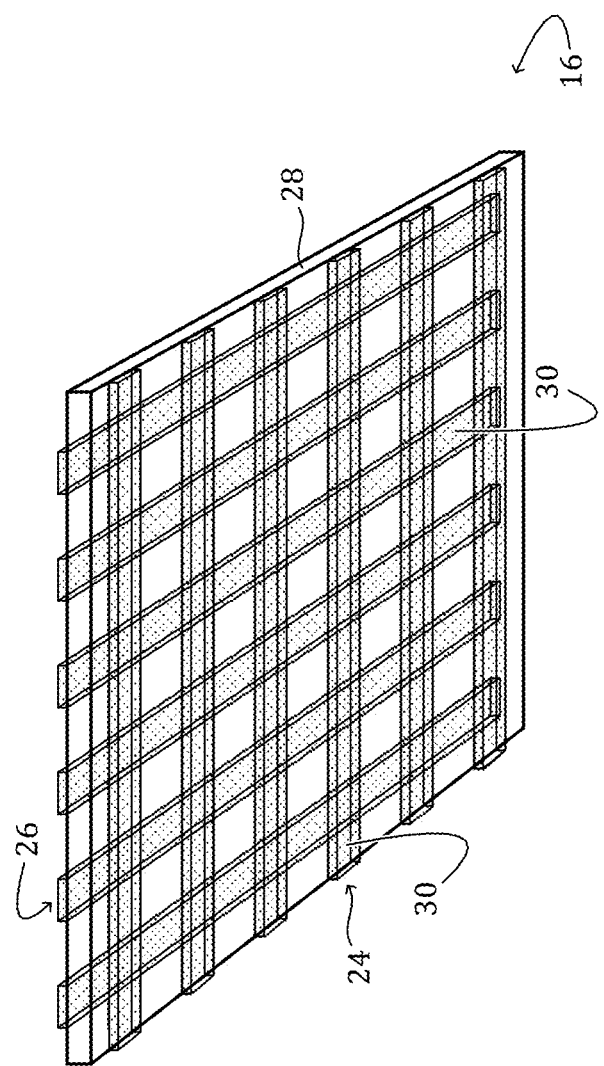
FIG. 2 shows aspects of an example capacitive touch sensor.

FIG. 2 shows aspects of an example capacitive touch sensor 16 in expanded detail. The capacitive touch sensor comprises a series of row electrodes 24 that cross a series of column electrodes 26. Touch sensors here contemplated may include any number N of row electrodes and any number M of column electrodes, providing MN crossings or intersections. Although it is customary to have the row electrodes aligned horizontally and the column electrodes aligned vertically, that aspect is in no way necessary, as the terms 'row' and 'column' may be exchanged everywhere in this description. In the illustrated example, the series of row electrodes 24 is arranged on one face of a dielectric layer 28, and the series of column electrodes 26 is arranged on the opposite face of the dielectric layer. The dielectric layer may be 50 to 100 μm in some examples, although other thickness ranges are also envisaged. The dielectric layer may comprise a polymer film, such as polyethylene terephthalate (PET). In curved, flexible and/or bendable touch-screen systems, the dielectric layer may be curved, flexible and/or bendable. Row electrodes 24 and column electrodes 26 each comprise electronically conductive material 30 distributed in the form of narrow (e.g., 1-mm wide), elongate bands on the opposite faces of dielectric layer 26. Adjacent electrodes may be separated by one to five millimeters in some examples. The composition of electronically conductive material 30 is not particularly limited. The electronically conductive material may comprise a metallic microwire mesh, a metal-particle or metal-island film, or a film of a degenerately doped semiconductor, such as indium-tin oxide (ITO), for instance. Irrespective of the implementation, a capacitive touch sensor comprising row and column electrodes of relatively low resistance and high optical transmittance is desirable.

Figure 3:
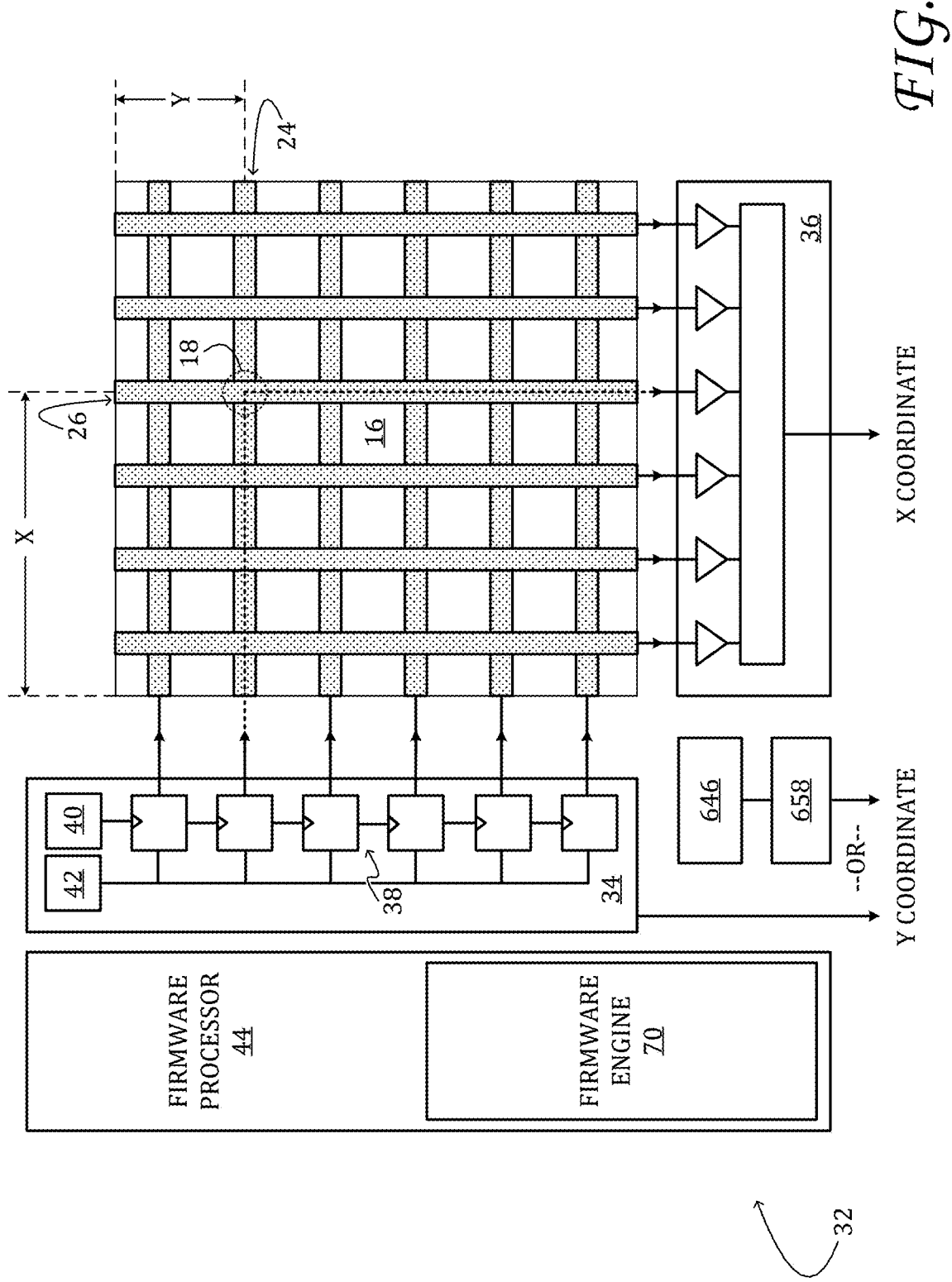
FIG. 3 shows aspects of an example capacitive touch sensor and associated touch-sensor logic.

Turning now to FIG. 3, row electrodes 24 and column electrodes 26 of capacitive touch sensor 16 are addressed by touch-sensor logic 32, which is coupled operatively to touch sensor 16. The touch-sensor logic is configured to sense contact on or near the front surface of the device, including coordinates (X, Y) directly beneath a touchpoint 18 on the front surface. To that end, the touch-sensor logic includes row-drive circuit 34 and column-sense circuit 36. The terms 'row-drive' and 'column-sense' are intuitive for configurations in which drive signal is driven through the row electrodes and sensed via the column electrodes. Based on that intuition, the terms 'column signal' and 'touch signal' are used interchangeably throughout this disclosure. Naturally, however, the opposite configuration is also envisaged.

Column-sense circuit 36 is configured to sense a column signal from the series of column electrodes 26. In the illustrated example, the column-sense circuit includes M column amplifiers, each coupled to a corresponding column electrode. Row-drive circuit 34 includes a local row counter 38 in the form of an N-bit shift register with outputs driving each of N row electrodes 24. The local row counter is clocked by row-driver clock 40. The local row counter includes a blanking input to temporarily force all output values to zero irrespective of the values stored within the shift-register. Excitation of one or more rows may be provided by filling the local row counter with ones at every output to be excited, and zeroes elsewhere, and then toggling the blanking signal with the desired modulation from modulation clock 42. In the illustrated example, the output voltage may take on only two values, corresponding to the one or zero held in each bit of the local row counter. In other examples, the output voltage may take on a greater range of values, to reduce the harmonic content of the output waveforms or decrease radiated emissions, for instance. In some examples, row-drive circuit 34 may include one or more additional registers offset with respect to local row counter 38 and blanked by modulation clocks of different frequencies. Such variants enable concurrent excitation of two or more row electrodes (e.g., electrodes separated by a fixed number of intervening rows).

Row-drive circuit 34 of FIG. 3 applies an excitation pulse to each row electrode 24 in sequence. In this manner, the row-drive circuit is configured to concurrently drive one or more row electrodes of the series of row electrodes while leaving undriven one or more other row electrodes of the series of row electrodes. During a period in which the front surface is untouched, none of the column amplifiers registers an above-threshold output. However, the electrical impedance at each crossing of a row electrode 24 and a column electrode 26 is responsive to the proximity of a finger or stylus to that crossing: when the user places a fingertip on the front surface, the fingertip capacitively couples one or more row electrodes 24 proximate to (e.g., crossing) touchpoint 18 to one or more column electrodes 26 also proximate to the touchpoint. The capacitive coupling induces the largest signal change from the column electrode directly behind the touchpoint and smaller changes from column electrodes to either side, which tail off with increasing distance from the touchpoint.

Column-sense circuit 36 returns, as the X coordinate of the touchpoint, the numeric value of the column providing the greatest signal received. Touch-sensor logic 32 determines which row was being excited when the greatest signal was received and returns the numeric value of that row as the Y coordinate of the touchpoint. In some examples, column-sense circuit 36 may also return a Z coordinate that varies in dependence on the strength of the signal received at coordinates (X, Y). Accordingly, touch-sensor logic 32 may distinguish firm touch, associated with strong signal, from light touch, associated with weaker signal, and from hover, associated with still weaker but detectable signal. Alternatively or in addition, the touch-sensor logic may provide an output that varies according to the area of contact—e.g., the number of touched electrodes—which also may relate to the touch force. For pen detection (vide infra), the shape of the touch locus over the electrodes may be used to distinguish ink and/or hover from noise.

Returning briefly to FIG. 1B, pen 22 may be used in lieu of the user's fingertip to execute touch input on electronic device 10. Accordingly, the touch sensor may be configured to sense the position of pen tip 42 relative to front surface 14. Like the user's fingertip, the tip of a passive pen comprises a high dielectric-constant material that capacitively couples the row and column electrodes under the touchpoint. A passive pen offers better touch accuracy than the fingertip, and may reduce smudging of the front surface. Although it is typical for a touch-screen input device to take the form of an elongate cylinder, that aspect is not strictly necessary. FIG. 1B also shows an alternatively shaped touch-input device 22' usable on a large-format electronic device 10'. It will be noted that touch-input devices of various shapes and sizes are envisaged herein and all references to a 'pen' apply equally to other touch-input devices. Relative to a passive pen, an active pen offers even greater touch accuracy, in addition to faster and more accurate tracking of the touchpoint. Aspects of active-pen tracking are described hereinafter, in the context of FIG. 8.

Figure 4:
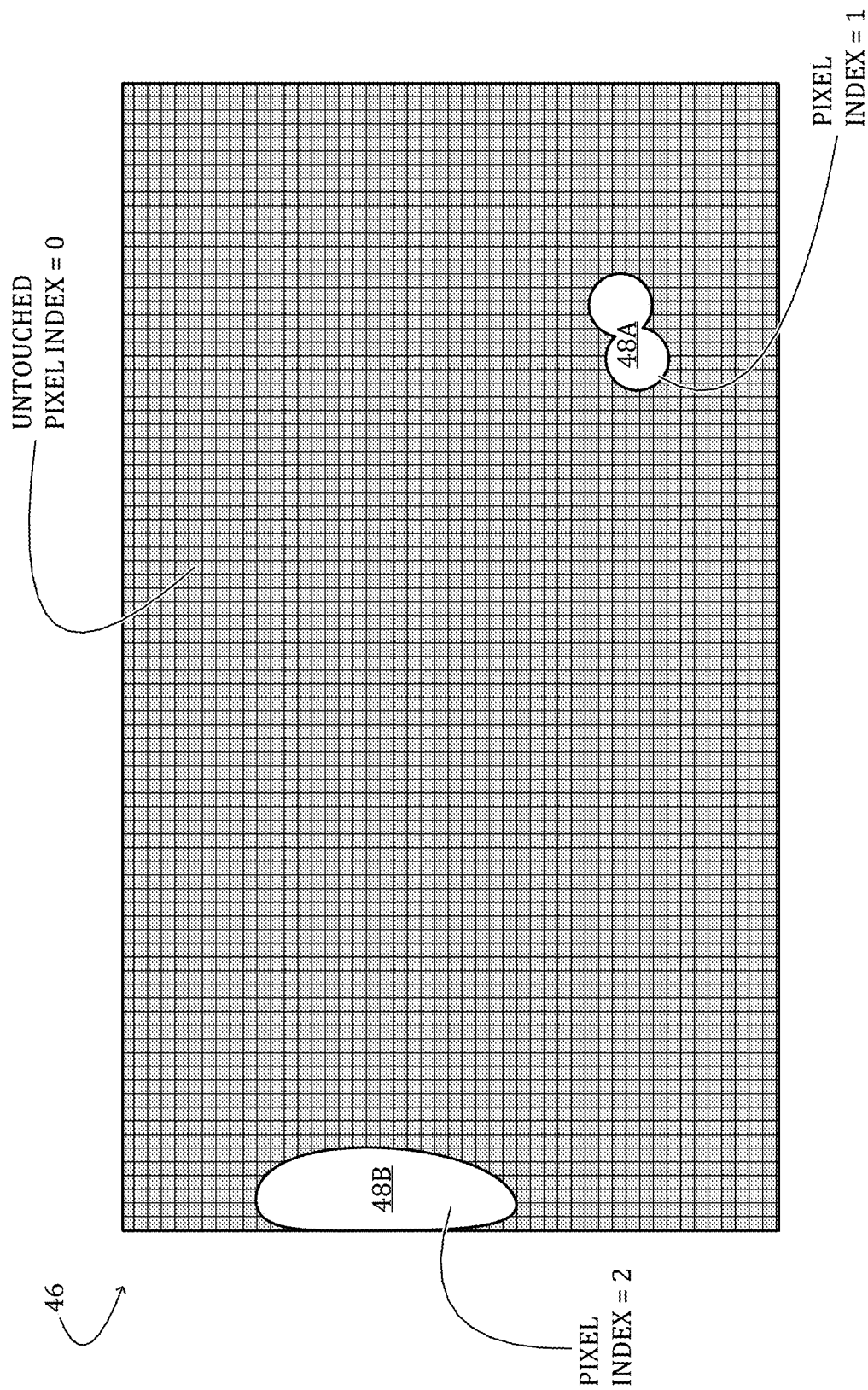
FIG. 4 shows aspects of an example map of touch signal.

As described hereinabove, touch-sensor logic 32 of FIG. 3 is configured to provide appropriate drive signal to the driven electrodes of the touch sensor and to digitize the signal acquired on the sensory electrodes. To that end, the touch-sensor logic may take the form of one or more dedicated, integrated-circuits (ICs), typically including at least one low-power, firmware processor 44. Touch-sensor logic is further configured to assemble a map of the touch signal acquired by the touch sensor. The map may be implemented using any suitable data structure, including as a matrix of touch-signal values collected at each crossing of row and column electrodes. Each row i of the matrix is the digitized form of the output of column-sense circuit 36, acquired on each column electrode when the ith row electrode is energized. Accordingly, the map includes a corresponding touch-signal value for each of the plurality of crossings, and may define at least one touched region of the touch sensor. Typically the touch-signal values are subject to de-noising. FIG. 4 shows aspects of such a map in one, non-limiting example. Overlaid on map 46 are first and second touched regions 48A and 48B. First touched region 48A is a region touched by two of the user's fingers. Second touched region 48B is a region touched by the user's thumb on the side of the device, which the user is holding. The term 'blob' can be used to refer to the contiguous matrix elements of the map corresponding to a given touched region, and the term 'heat map' can be used to refer to the map.

Returning again to FIG. 1A, device 10 includes an inertial-measurement unit (IMU) 50. The IMU may include an electronic accelerometer and electronic gyroscope configured to provide a six degrees-of-freedom (DOF) determination of the linear and angular acceleration of the electronic device. In some examples the IMU may also include a magnetometer-based electronic compass. Thus, the IMU may be configured to furnish estimates of the relative and absolute orientation of the device.

Figure 5:
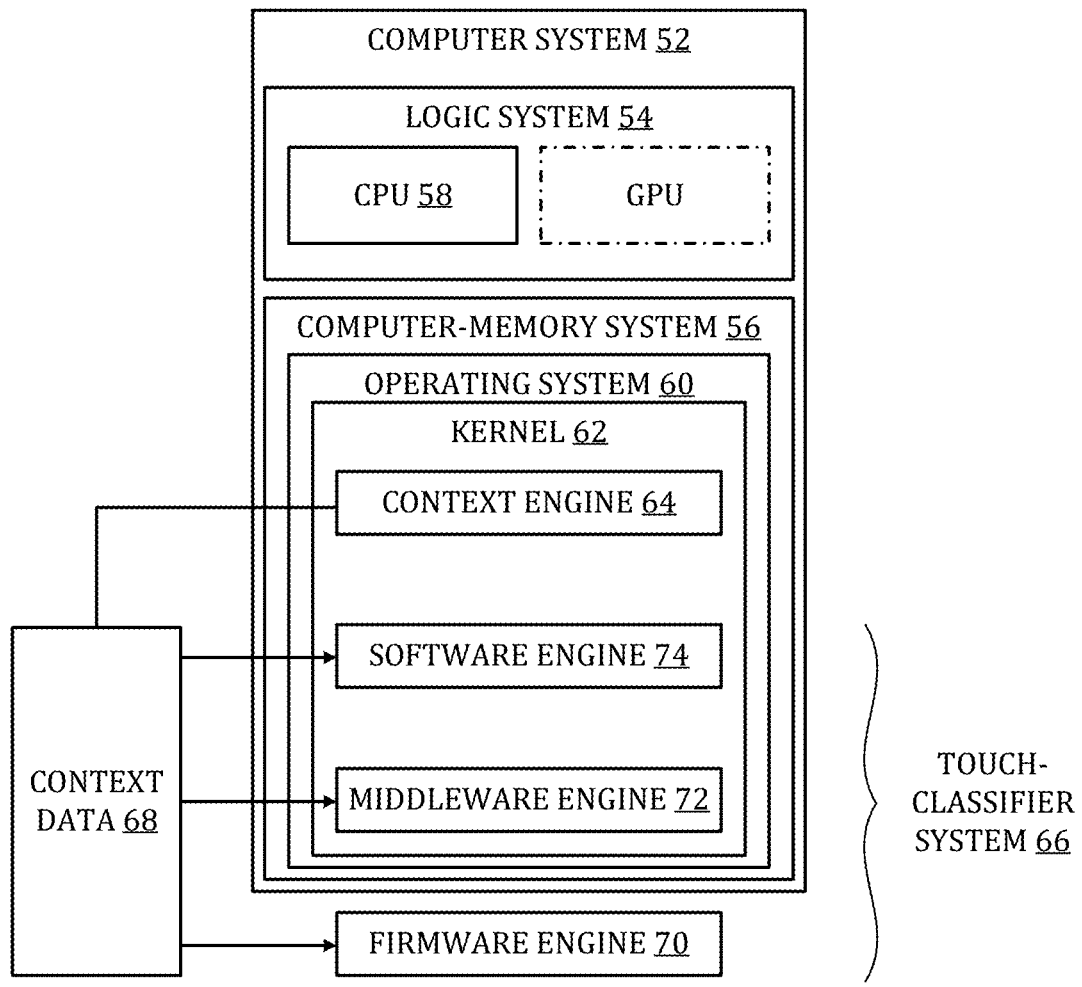
FIG. 5 shows aspects of an example computer system.

Device 10 also includes a computer 52. FIG. 5 shows, schematically, selected aspects of the computer. Computer 52 has a logic system 54 and a computer-memory system 56 coupled operatively to the logic system. The logic system may include at least one processor—e.g., a central processing unit (CPU) 58 and/or a graphics processing unit (GPU). The computer-memory system holds, in addition to other data, program instructions that, when executed by the logic system, cause the logic system to undertake various acts. In the illustrated example, the computer-memory system holds instructions for the operating system (OS) 60 of device 10, including the kernel 62, and one or more applications (not shown in the drawings). Instructions held in the computer-memory system may cause the logic system to instantiate one or more machines or engines as described herein. In the example shown in FIG. 5, the instructions cause the logic system to instantiate a context engine 64 and at least part of a system of engines denoted herein as 'touch-classifier system' 66. It will be understood, however, that in some examples part of the touch-classifier system executes in touch-sensor logic 32, as opposed to computer 52 (vide infra).

Figure 6B:
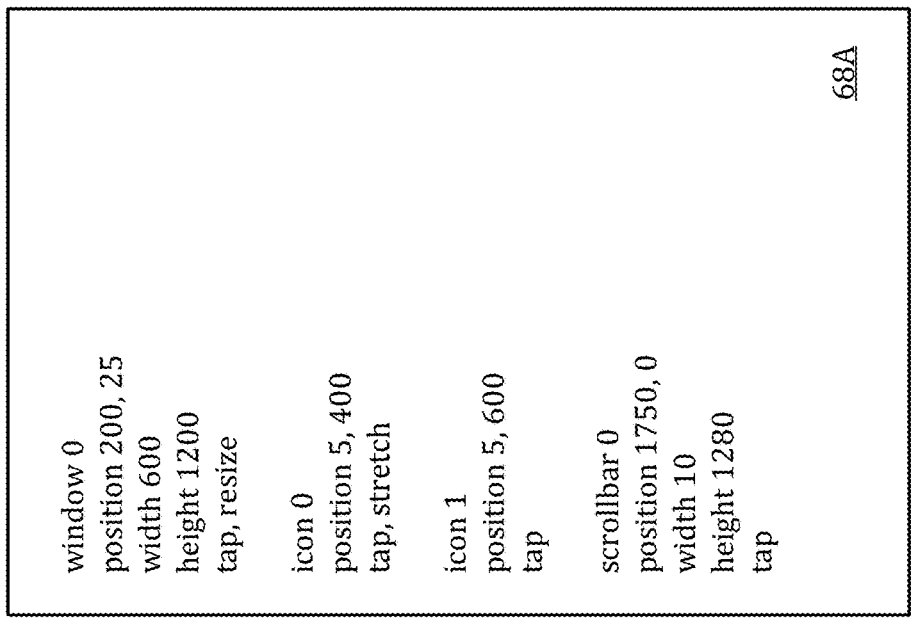
FIG. 6B shows aspects of context data corresponding to the example layout of FIG. 6A.
Figure 6A:
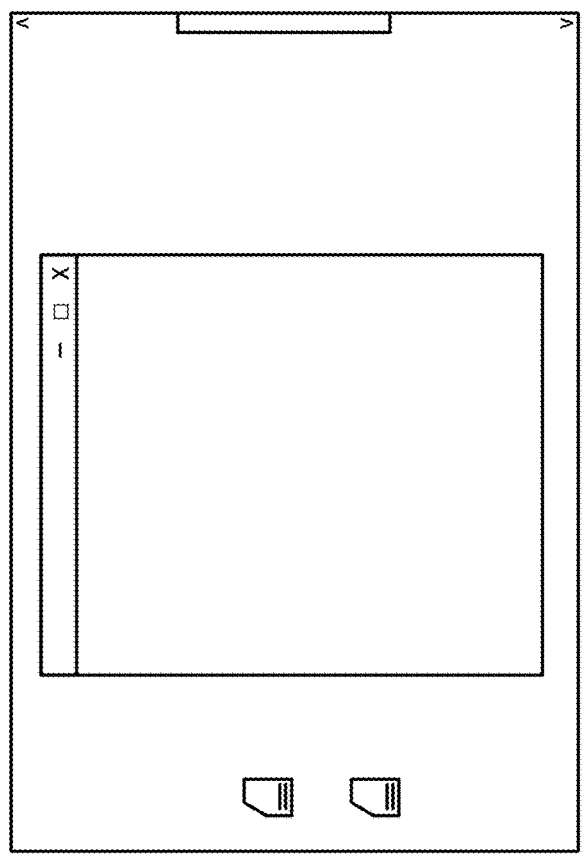
FIG. 6A shows aspects of an example layout of user-interface elements on a display.

Context engine 64 is configured to gather and serve context data 68, which relates at least to the user-interface (UI) content currently presented on electronic display 12. In the example illustrated in FIG. 5 the context engine is part of OS kernel 62 of device 10, which provides the technical benefit of direct observation of the various UI-update events requested by the applications. The context data may be gathered from any application running on the device, including the OS shell, or from the graphical layer itself. Generally speaking, the context data does more than merely indicate which applications are currently running; it includes the screen positions and dimensions of each of the UI elements, as well as an indication of the touch events each UI element can 'handle', in an event-processing sense. The context data provides a touch-signal independent basis for distinguishing valid from invalid touched regions, which offers the technical effect of reducing the likelihood that inadvertent touch will trigger a UI response. FIG. 6A shows aspects of an example layout of user-interface elements on a display, and FIG. 6B shows aspects of context data 68A corresponding to the example layout of FIG. 6A.

In a modern application framework, each UI element shown on a display is painted by a methods linked to a programmatic object as that object is created or updated. Because every paint method includes a call to the OS, the OS 'knows' the layout of the UI elements on the display at any given time, as well as the dimensions of each UI element. The OS also knows which touch events a given UI element must respond to, and which it may ignore. By virtue of this configuration, context engine 64 can be configured to 'snoop' on the various object-creation and -update events and assemble, maintain, and/or update a file of context data 68. The file may have any suitable format, including a JSON format. In some examples, the file may be a memory-mapped file, which can be exposed with low latency to any engine of touch-classifier system 66.

Touch-classifier system 66 is configured to compute classified touch data corresponding to the map of touch signal, based partly on the map itself and partly on context data 68. The classified touch data includes at least a pair of (X, Y) coordinates for every valid touched region of the map. The classified touch data may also include an indication of touch class (e.g., one finger or two fingers). The touch-classifier system is further configured to provide the classified touch data to OS 60 of device 10. The technical effect of the touch-classifier system is to fold the context data into downstream determinations of touch validity, thereby improving the accuracy of the determinations and reducing false positives. In the example illustrated in FIG. 5 touch-classifier system 66 includes firmware engine 70, middleware engine 72, and software engine 74.

Instructions and/or other logic comprising firmware engine 70 execute on firmware processor 44 of touch-sensor logic 32. Such logic coordinates the digitized output of the column sense amplifiers with the row counter to generate a (potentially noisy) map of capacitance or admittance as a function of column position X and row position Y. The firmware engine executes a de-noising routine to subtract common-mode noise that could be injected from the electronic display, power supply, or electrical mains, for instance. One non-limiting strategy for electromagnetic-noise suppression on a capacitive touch sensor is to locate at least one untouched sensory electrode somewhat removed from the touchpoint and use that electrode as a reference— i.e., an indicator of the common-mode noise, which can then be subtracted from the signal recorded at the touchpoint. The firmware engine then enacts a rough segmentation on the de-noised map. To that end, the segmentation algorithm may compare each de-noised signal value to a threshold to determine whether the corresponding electrode crossing (X, Y) is part of a touched region. The segmentation algorithm then identifies matrix elements corresponding to contiguous touched regions with a like numeric index, and identifies matrix elements corresponding to non-contiguous touched regions with unlike numeric indices, as shown in FIG. 4.

Instructions comprising middleware engine 72 execute at the OS level, on a CPU or GPU of computer system 52, or on a side processor. The middleware engine may be configured to roughly classify the matrix elements corresponding to each of the touched regions according to shape.

Instructions comprising software engine 74 execute at the OS level, on a CPU or GPU of computer system 52. The software engine is configured to complete the classification of each of the matrix elements corresponding to the touched regions into one of a plurality of predefined classes. Such classes may include 'single finger', 'two fingers', 'more than two fingers', or 'palm', for instance. Classes such as 'one finger' or 'two fingers' are classes of valid touch, while the others are classes of invalid touch. In some examples the software engine may include a neural network trained to enact the classification; in some examples deterministic logic may be used. Whether via a neural-network or a deterministic approach, the software engine may be configured to fuse output from middleware engine 72 with other inputs or indications—e.g., input from a pen-tracking system. In one example an indication of valid pen signal may be used, according to a suitable heuristic, to reduce the probability that a given touched region is associated with a valid class. In other words, the matrix elements corresponding to a given touched region may be classified with greater likelihood as invalid when valid pen signal is detected concurrently. In another example the software engine may fuse input from IMU 50 with the output of the middleware engine in order to influence the classification. Software engine 74 is further configured to generate and serve a touch report that can be exposed to any appropriately permissioned application executing on device 10.

In the example Illustrated in FIG. 5, firmware engine 70, middleware engine 72, and software engine 74 each receive context data 68 relating to user-interface content currently presented on the electronic display. In other examples only one or two of the engines may receive the context data.

Figure 7:
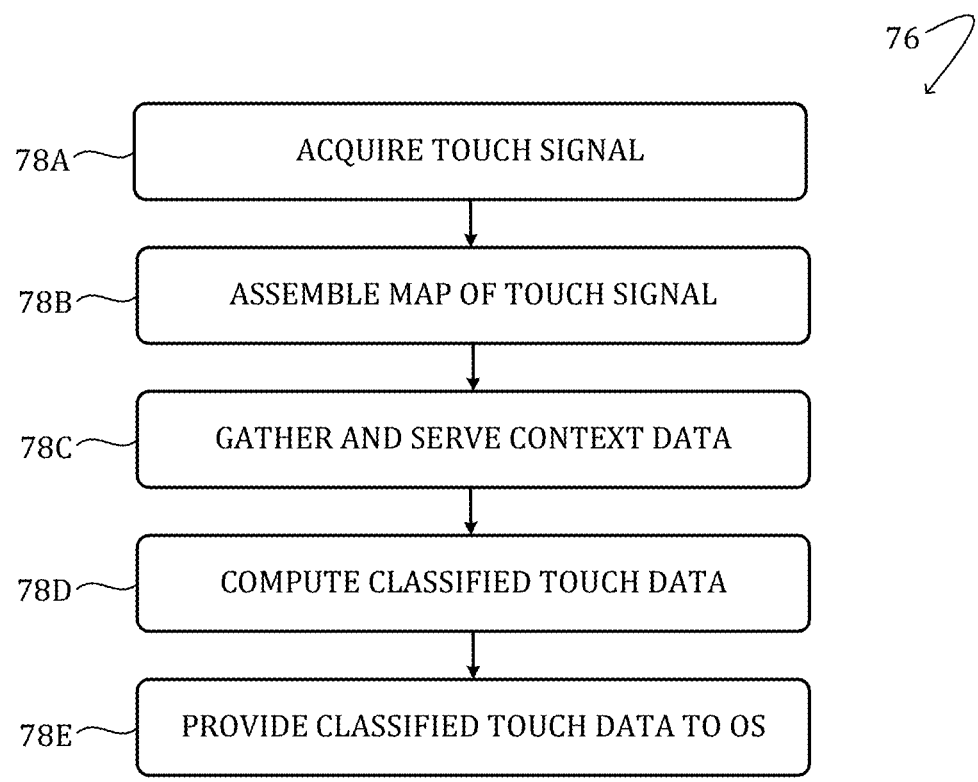
FIG. 7 shows aspects of an example method to provide classified touch data to a computer program executing on a device.

FIG. 7 shows aspects of an example method 76 to provide classified touch data to a computer program executing on a device. The device has an integrated electronic display and a touch sensor arranged on the electronic display, as noted above.

At 78A of method 76, the touch sensor acquires touch signal on a plurality of sensory electrodes. The term 'touch signal' refers collectively to the set of component touch signals from each sensory electrode, typically coordinated to the output of a row counter. At 78B touch-sensor logic coupled operatively to the touch sensor assembles a map of touch signal from the touch sensor. In scenarios relevant to method 76, the map includes a plurality of crossings of row and column electrodes, the map including a corresponding touch-signal value for each of the plurality of crossings, and defining at least one touched region of the touch sensor. At 78C the context engine of the device gathers and serves context data relating to user-interface content currently presented on the electronic display. The touch-classifier system receives the context data.

At 78D the touch-classifier system of the device computes classified touch data corresponding to the map of touch signal. At 78E the touch-classifier system provides the classified touch data computed at 78D to an operating system of the electronic device.

The classified touch data is based partly on the map of touch signal assembled at 78B and partly on the context data served at 78C. As noted above, the classified touch data includes at least a pair of (X, Y) coordinates for every touched region of the map and may also include an indication of touch class (e.g., one finger or two fingers). Generally speaking, the touch-classifier system may employ variable strictness or leniency for determining whether valid touch has been received in a given touched region. One technical effect of this feature is to provide a base metric that can be used in connection with a variable threshold—i.e., a threshold that can be adjusted upward or downward in view of context data 68, in order to secure the benefits noted above. The variable strictness or leniency can be parameterized in various ways—e.g., via thresholds or acceptance intervals against which certain metrics of a touched region are compared. Some useful metrics may quantify the size of a touched region—e.g., its diameter or perimeter. Smaller touched regions are more likely to result from purposeful touch of a finger, whereas larger touched regions are more likely to result from accidental touch of a palm or side of a hand. Accordingly, the determination of validity can be made stricter by reducing a size threshold, or more lenient by increasing it, both to a degree controlled by the context data. In that manner the classified touch data can be computed based partly on the size of a touched region as revealed in the map, and based partly on the context data. In addition to size, the shapes of the various touched regions may be assessed for similarity to the shape of finger touch, as opposed to the touch of some other part of the hand. Just like the size, the similarity metric can be compared against a threshold, dependent on the context data, to determine whether the touched region is receiving valid touch. Assessing the validity of touch input according to the size and/or shape of the touched region offers the technical benefit of providing a baseline indication of whether or not the touch corresponds to the intentional touch of the user's finger.

Another useful metric is the duration of touch in a given touched region. Purposeful touch is likely to last only a fraction of a second, while the touch resulting from the user gripping the device or laying a hand over the device while writing is likely to last longer. In some examples computing the classified touch data includes reporting touch on the touched region if the touched region vanishes within a time interval responsive to the context data.

Another useful metric is the distance of the touched region from an edge of the display. In typical operating scenarios, user activity is likely to be concentrated toward the middle of the display, as opposed to the edges. Thus, in some examples the classified touch data is computed based at least partly on a location of a touched region with respect to the display. Thresholds or acceptance intervals used with any of these metrics, among others, can be made stricter or more lenient by adjustment responsive to the context data, as described in greater detail below.

In some examples the feature of the context data that is most useful for assessing whether a touched region is receiving valid touch is the layout of UI elements on the display. For instance, in examples in which the size of a touched region is compared against a threshold to determine validity, the threshold can vary in dependence on one or more aspects of UI elements co-located with the touched region on the display. This feature enables the detailed UI layout to influence which touch regions are recognized as valid, and which are invalid, providing the important technical effect of reducing the frequency of false touch detection when the touch region is not appropriate for the UI elements (if any) localized in the area of the touched region. Larger UI elements such as icons may raise the threshold, and smaller UI elements such as a scroll bar may lower the threshold. In these examples, computing the classified touch data may include reporting touch on a touched region if the touched region is smaller than a co-located UI element, or smaller than a spacing between adjacent, co-located UI elements. In other examples in which a size threshold is used to parameterize strictness or leniency, the threshold may be set higher for areas of the display in which inadvertent touch is probable, such as an edge, and lower for areas of the display in which touch input is expected, such as within a virtual keypad or a text box. In some examples computing the classified touch data may include reporting touch on a touched region only if the touched region is located within a predetermined, input-receiving UI element (e.g., the virtual keypad or text box), and not reporting touch if the touched region is located outside of the input-receiving UI element. In examples in which touch input is expected within the confines of a virtual keypad, valid touched regions may be limited to the size of a key.

More generally, a threshold can be made stricter for areas of the display in which user input is less probable, in a heuristic sense. Such areas may include areas devoid of user interface elements, and/or areas where tapping would change the input focus to a different application. For instance, computing the classified touch data may include reporting touch on a touched region only if a user-interface element (e.g., an icon) is within a threshold distance of the touched region. In another example, if a web browser is open and covering 80% of the display, then a strict threshold for valid touch input outside of the browser's client area may be enforced, so that inadvertent hand contact for hover does not steal focus from the web browser. Similarly, a strict threshold for valid touch input may be used in the vicinity of a scroll bar, in order to prevent false scrolling.

In some examples computing the classified touch data includes reporting touch on the touched region if the touched region spans only one user-interface element. Consider a scenario in which a tablet computer is being used in desktop mode, and a grouping of icons for executable functions is presented on the display, perhaps on the side of the screen where the user is gripping the tablet, and perhaps the user's grip extends over two or three of the icons. Because the context data establishes the size of each icon, and because simultaneous selection of plural icons is not a valid action, the touch input from the user's grip can be rejected.

In some examples the context data served by the context engine may reflect (e.g., indicate) which input-output componentry is currently in use on the device. Such componentry may include a camera, microphone, speakers, touchpad, or external monitor, for instance. If a physical keyboard is connected (wirelessly or hard-wired) to the device, or if a microphone is being used to receive voice typing, then the likelihood of receiving purposeful touch input is reduced, and the touch-classifier system may be configured to reflect that condition in the classified touch data. Likewise, the classified touch data may reflect whether or not concurrent pen signal is being received by the device, and touch on the touched region may be reported only in the absence of concurrent pen signal. In some examples the context data reflects pen location, pen orientation, or the distance between the pen and the device. In some examples the context data indicates which wireless network the device is connected to, because that is an indication of the environment in which the device is being used, and that condition is reflected in the classified touch data. For instance, connection to a cellular network may be an indication that the device is being used in a vehicle, where accidental touch is more likely. In sum, the above features of registering certain aspects of the hardware state in the context data offers the technical benefit of allowing that information to be used in a heuristic sense to influence the determination of whether or not touch on a given touched region is purposeful.

Additional examples and scenarios are also envisaged. For instance, the context data may reflect the physical orientation of the device. The orientation may be revealed via accelerometer output, for instance, and may reflect whether the device is being used in portrait or landscape mode. That information, together with the handedness of the user, can be used to inform whether a touched region near a certain bezel is receiving valid touch. Thus, in some examples the context data reflects user handedness.

For ease of illustration, the examples above are described as though the various determinations are made via deterministic and/or fuzzy logic. The reader should keep in mind, however, that such determinations can also be made using a trained neural network that processes the map and the context data concurrently—i.e., receives and fuses both forms of data at the input level of neurons. A neural network may be trained to make these determinations using training data comprising a set of appropriately labeled maps and context-data files.

Relative to existing approaches, the solutions herein reduce false positives for valid touch detection. They also reduce the latency and power consumption for detecting valid touch, by rejecting invalid touch events earlier in the processing pipeline and by significantly limiting the area of the touch sensor over which apparent touch events must be processed in a CPU or GPU. In some examples, the processing overhead can be further reduced by updating the contextual information only when a change is made to the UI layout on the display.

Figure 8:
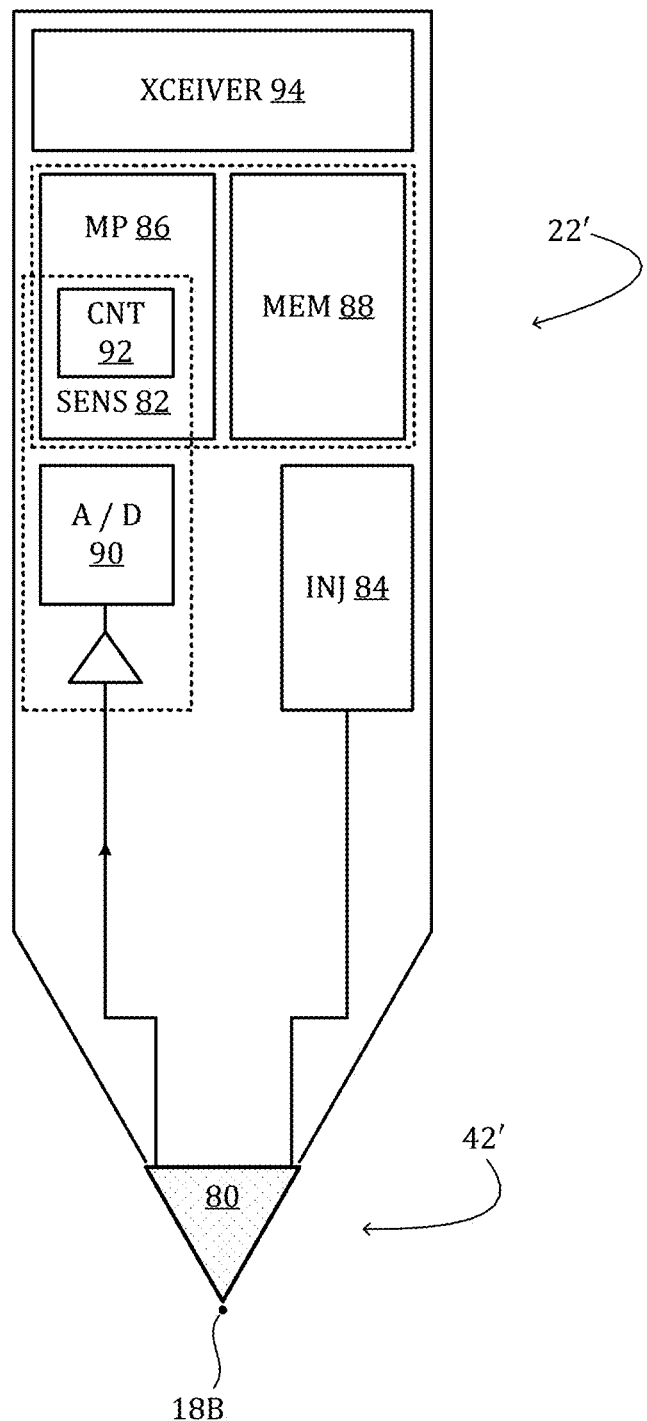
FIG. 8 shows aspects of an example pen configured to provide input to a capacitive touch sensor.
Figure 9:
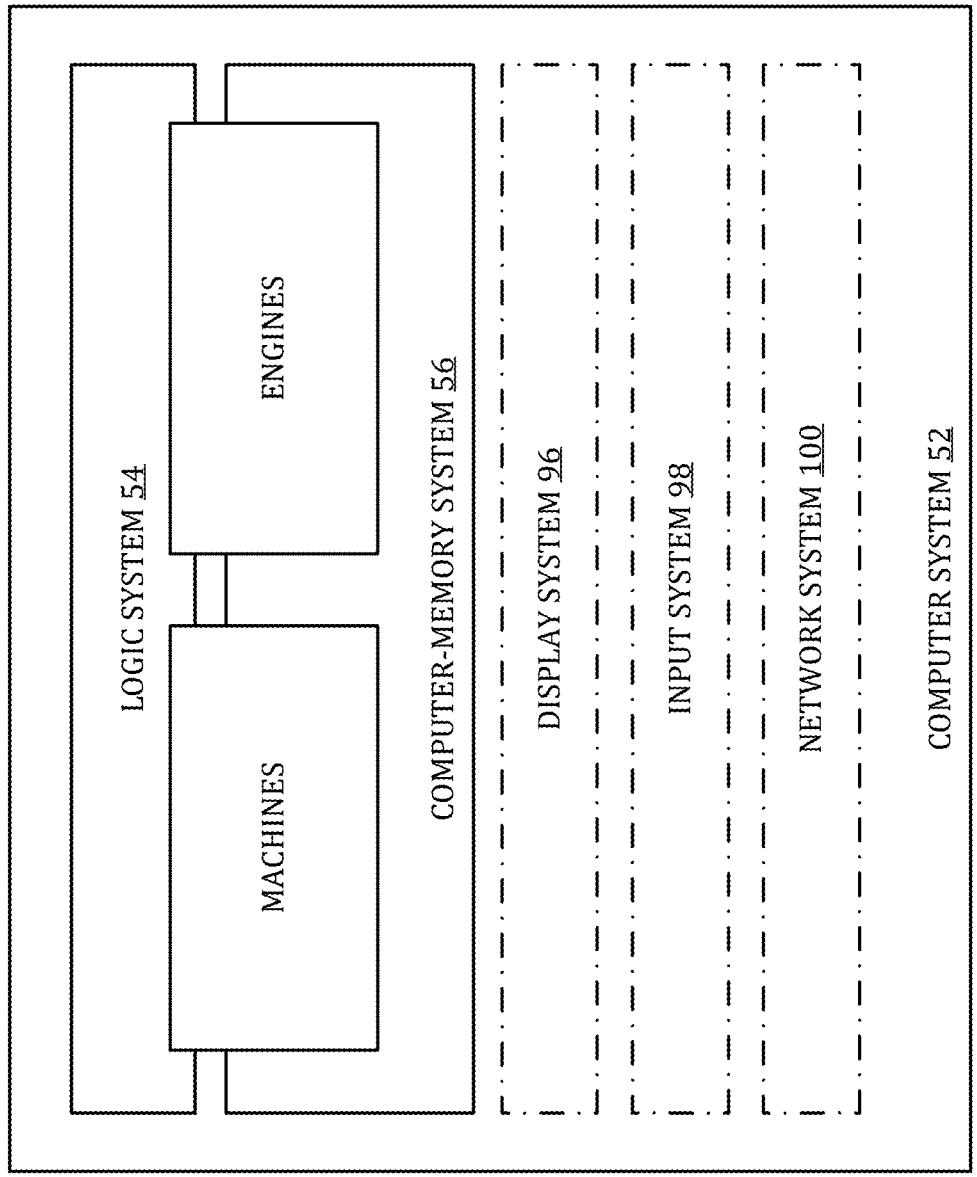
FIG. 9 shows additional aspects of the example computer system of FIG. 5.

FIG. 8 shows aspects of an example active pen 22'. In FIG. 7, probe electrode 80 is arranged at tip 42' of active pen 22'. The probe electrode is coupled operatively to associated sensory logic 82 and injection logic 56. The sensory and injection logic are coupled to, and may be embodied partially within, microprocessor 86, which is configured for digital signal processing (DSP). The microprocessor is coupled operatively to computer memory 88. Sensory logic 82 includes linear analog componentry configured to maintain probe electrode 80 at a constant voltage and to convert any current into or out of the probe electrode into a proportional current-sense voltage. The sensory logic may include an analog-to-digital (A/D) converter 90 that converts the current-sense voltage into digital data to facilitate subsequent processing.

Instead of capacitively coupling row and column electrodes of the capacitive touch sensor via a dielectric, sensory logic 82 of active pen 22' senses the arrival of an excitation pulse from row electrode 24, behind touchpoint 18B, and in response injects charge into column electrode 26, also behind the touchpoint. To that end, injection logic 56 is configured to control charge injection from the probe electrode 80 to the column electrode directly beneath the probe electrode. The injected charge appears, to column-sense circuit 36, similar to an electrostatic pulse delivered via capacitive coupling of the column electrode to an energized row electrode intersecting at the touchpoint.

In some examples, sensory logic 82 and injection logic 56 are active during non-overlapping time windows of each touch-sensing frame, so that charge injection and charge sensing may be enacted at the same probe electrode 80. In this implementation, touch-sensor logic 32 excites the series of row electrodes 24 during the time window in which the sensory logic is active, but suspends row excitation during the time window in which the pen 22' may inject charge. This strategy provides an additional advantage, in that it enables touch-sensor logic 32 to distinguish touchpoints effected by pen 22' from touchpoints effected by a fingertip or palm. If column-sense circuit 36 detects charge from a column electrode 26 during the charge-injection time window of the pen 22' (when none of the row electrodes 24 are excited), then touchpoint 18B detected must be a touchpoint of the pen. However, if the column-sense logic detects charge during the charge-sensing window of the pen (when row electrodes 24 are being excited), then the touchpoint detected may be a touchpoint of a fingertip, hand, or passive pen, for example.

In some examples row electrodes 24, which stop injecting charge during the pen-resolution window, are repurposed as sensory electrodes within that window. In configurations that support this function, each of the row drivers of row counter 38 has a three-state output including a high-impedance state, and every row electrode 24 is matched to a row-sense amplifier (not shown in the drawings but analogous to the column-sense amplifiers of column-sense circuit 36). While the row drivers are poised in the high-impedance state, the row-sense amplifiers provide touch signal for computing the Y coordinate of the pen position, analogous to the touch signal from the column-sense circuit from which the X coordinate is computed. In still other examples and scenarios, this feature may be employed even during the window in which finger touch is resolved—i.e., undriven row electrodes can be repurposed as sensory electrodes. Continuing, now, with the active-pen description, when receiving the signal from a row electrode 24, the pen 22' may inject a charge pulse with amplitude proportional to the received signal strength. Capacitive touch sensor 16 receives the electrostatic signal from pen 22' and calculates the Y coordinate, which may be the row providing the greatest signal from the pen, or a function of the signals received at that row and adjacent rows.

Active sensing followed by charge injection enables a touchpoint 18B of a very small area to be located precisely, and without requiring long integration times that would increase the latency of touch sensing. Nevertheless, this approach introduces certain challenges related to noise suppression. Various solutions—for example, code division or frequency division multiple access—may be applied to cancel the strong interference at the receiving direction from the transmitting direction. The capacitive touch sensor may be required to receive two signals simultaneously (one from the row electrode 24, and the other from probe electrode 80). Another solution is to require pen 22' to assume a more active role in determining the touchpoint coordinates. In the illustrated example, sensory logic 82 of the active pen 22' includes a remote row counter 92, which is maintained in synchronization with local row counter 38 of touch-sensor logic 32. This feature gives the pen and the touch screen a shared timing, but without being wired together.

When probe electrode 80 touches the front surface, sensory logic 82 receives a waveform that lasts as long as the touch is maintained. The waveform acquires maximum amplitude at the moment in time when row electrode 24, directly beneath (i.e., adjacent) the probe electrode 80, has been energized. Sensory logic 82 is configured to sample the waveform at each increment of the remote row counter 92 and determine when the maximum amplitude was sensed. This determination can be made once per frame, for example.

Because active pen 22' and touch-sensor logic 32 have shared timing due to synchronized row counters, the state of local row counter 92 at maximum sensed amplitude reports directly on the row coordinate—i.e., the Y coordinate—of touchpoint 18B. In order to make use of this information, the Y coordinate must be communicated back to touch-sensor logic 32. To this end, the pen includes transceiver 94 configured to wirelessly communicate the computed row coordinate to row-sense logic of the touch screen. This disclosure embraces various modes of communicating data, including the Y coordinate, from the pen to the touch screen.

In each of the variants noted above, among others, touch-sensor logic 32 is configured to provide a pen signal responsive to the action of a pen on the associated touch sensor 16. In these examples, the pen signal comprises the analog output of column-sense circuit 36 with reference to the timing defined by sensory logic 82 of pen 22'.

As noted above, the methods herein may be tied to a computer system of one or more computing devices. Such methods and processes may be implemented as an application program or service, an application programming interface (API), a library, and/or other computer-program product.

FIG. 8 provides a schematic representation of a computer system 52 configured to provide some or all of the computer system functionality disclosed herein. Computer system 52 may take the form of a personal computer, application-server computer, or any other computing device.

Computer system 52 includes a logic system 54 and a computer-memory system 56. Computer system 52 may optionally include a display system 96, an input system 98, a network system 100, and/or other systems not shown in the drawings.

Logic system 54 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 56 includes at least one physical device configured to temporarily and/or permanently hold computer system information, such as data and instructions executable by logic system 54. When the computer-memory system includes two or more devices, the devices may be collocated or remotely located. Computer-memory system 56 may include at least one volatile, nonvolatile, dynamic, static, read/write, read-only, random-access, sequential-access, location-read addressable, file-read addressable, and/or content-read addressable computer-memory device. Computer-memory system 56 may include at least one removable and/or built-in computer-memory device. When the logic system executes instructions, the state of computer-memory system 56 may be transformed— e.g., to hold different data.

Aspects of logic system 54 and computer-memory system 56 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 54 and computer-memory system 56 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 96 may be used to present a visual representation of data held by computer-memory system 56. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 98 may comprise or interface with one or more input devices. An input device may include a sensor device or a user input device. Examples of user input devices include a keyboard, mouse, or touch screen.

When included, network system 100 may be configured to communicatively couple computer system 52 with one or more other computer systems. The network system may include wired and/or wireless communication devices compatible with one or more different communication protocols. The network system may be configured for communication via personal-, local- and/or wide-area networks.

In conclusion, one aspect of this disclosure is directed to a device comprising an electronic display, a touch sensor arranged on the electronic display and including a plurality of crossings of row and column electrodes, and operatively coupled touch-sensor logic, a context engine, and a touch-classifier system. The touch-sensor logic is configured to assemble a map of touch signal from the touch sensor, the map including a corresponding touch-signal value for each of the plurality of crossings, and defining at least one touched region of the touch sensor. The context engine is configured to gather and serve context data relating to user-interface content currently presented on the electronic display. The touch-classifier system is configured to compute classified touch data corresponding to the map of touch signal, based at least partly on the map and on the context data, and to provide the classified touch data to an operating system of the device.

In some implementations the operating system comprises the context engine. In some implementations the context data reflects which input-output componentry is in use on the device. In some implementations the device further comprises an accelerometer, and the context data reflects an orientation of the device. In some implementations the context data reflects which wireless network the device is connected to. In some implementations the classified touch data is computed based at least partly on a size of the at least one touched region as revealed in the map. In some implementations the classified touch data is computed based at least partly on a location of the at least one touched region with respect to the display. In some implementations the context data reflects one or both of pen location and pen orientation. In some implementations the context data reflects user handedness.

Another aspect of this disclosure is directed to a method to provide classified touch data to a computer program executing on a device with an integrated electronic display. The method comprises: (a) assembling a map of touch signal from a touch sensor arranged on the electronic display and including a plurality of crossings of row and column electrodes, the map including a corresponding touch-signal value for each of the plurality of crossings, and defining at least one touched region of the touch sensor; (b) serving context data relating to user-interface content currently presented on the electronic display; (c) computing classified touch data corresponding to the map of touch signal based at least partly on the map and on the context data; and (d) providing the classified touch data to an operating system of the device.

In some implementations computing the classified touch data includes reporting touch on the at least one touched region if a user-interface element is within a threshold distance of the at least one touched region. In some implementations computing the classified touch data includes reporting touch on the at least one touched region if the at least one touched region spans only one user-interface element. In some implementations computing the classified touch data includes reporting touch on the at least one touched region if the at least one touched region vanishes within a predetermined time interval. In some implementations computing the classified touch data includes reporting touch on the at least one touched region if the at least one touched region is located within a predetermined, input-receiving user-interface element and not reporting the touch if the at least one touched region is located outside of the predetermined, input-receiving user-interface element. In some implementations computing the classified touch data includes reporting touch on the at least one touched region if no pen signal is received concurrently on the device. In some implementations computing the classified touch data includes reporting touch on the at least one touched region if the at least one touched region is within a predetermined size for a co-located user-interface element. In some implementations computing the classified touch data includes reporting touch on the at least one touched region if the at least one touched region is smaller than a co-located user-interface element or a spacing between adjacent, co-located user-interface elements.

Another aspect of this disclosure is directed to a handheld device comprising an electronic display, a touch sensor arranged on the electronic display and including a plurality of crossings of row and column electrodes, and operatively coupled touch-sensor logic, a context engine, and a touch-classifier system. The touch-sensor logic is configured to assemble a map of touch signal from the touch sensor, the map including a corresponding touch-signal value for each of the plurality of crossings, and defining at least one touched region of the touch sensor. The context engine is configured to gather and serve context data relating to user-interface content currently presented on the electronic display. The touch-classifier system is configured to compute classified touch data corresponding to the map of touch signal, based at least partly on the map and on the context data, and to provide the classified touch data to an operating system of the handheld device.

In some implementations the touch-classifier system includes a firmware engine executing on a dedicated touch-processor chip of the touch-sensor logic. In some implementations the touch-classifier system includes a software engine executing on a processor of the handheld device.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits. A value that is based at least partly on A and on B is based on A, is further based on B, and may or may not be based on other factors besides A and B.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A device comprising:
an electronic display;
a touch sensor arranged on the electronic display and including a plurality of crossings of row and column electrodes;
touch-sensor logic coupled operatively to the touch sensor and configured to assemble a map of touch signal from the touch sensor, the map including a corresponding touch-signal value for each of the plurality of crossings, and defining at least one touched region of the touch sensor;
a context engine configured to gather and serve context data gathered from an application running on the device, wherein the context data is an indication of an environment in which the device is being used and is related to user-interface content currently presented on the electronic display, the context data including a layout of user-interface elements presented on the electronic display by the application running on the device and a distance of the at least one touched region from an edge of the electronic display; and
a touch-classifier system configured to compute classified touch data corresponding to the map of touch signal,
wherein the touch-classifier system classifies the at least one touched region as a valid touch input or an invalid touch input based at least partly on whether the distance of the touched region from the edge of the electronic display is within a threshold distance, and wherein the threshold distance is variable based at least in part on gathered context data, and
wherein the touch-classifier system is further configured to report the classified touch data to an operating system of the device.

2. The device of claim 1 wherein the operating system comprises the context engine.

3. The device of claim 1 wherein the context data reflects which input-output componentry is in use on the device.

4. The device of claim 1 further comprising an accelerometer, wherein the context data reflects an orientation of the device.

5. The device of claim 1 wherein the context data reflects which wireless network the device is connected to.

6. The device of claim 1 wherein the classified touch data is computed based at least partly on a size of the at least one touched region as revealed in the map.

7. The device of claim 1 wherein the classified touch data is computed based at least partly on a location of the at least one touched region with respect to the display.

8. The device of claim 1 wherein the context data reflects one or both of pen location and pen orientation.

9. The device of claim 1 wherein the context data reflects user handedness.

10. A method to provide classified touch data to a computer program executing on a device having an integrated electronic display, the method comprising:

assembling a map of touch signal from a touch sensor arranged on the electronic display and including a plurality of crossings of row and column electrodes, the map including a corresponding touch-signal value for each of the plurality of crossings, and defining at least one touched region of the touch sensor;

serving context data gathered from an application running on the device, wherein the context data is an indication of an environment in which the device is being used and is related to user-interface content currently presented on the electronic display, the context data including a layout of user-interface elements presented on the electronic display by the application running on the device and a distance of the at least one touched region from an edge of the electronic display;

computing classified touch data corresponding to the map of touch signal using a touch-classifier system, wherein the touch-classifier system classifies the at least one touched region as a valid touch input or an invalid touch input based at least partly on whether the distance of the touched region from the edge of the electronic display is within a threshold distance, and wherein the threshold distance is variable based at least in part on gathered context data; and reporting the classified touch data to an operating system of the device.

11. The method of claim 10 wherein computing the classified touch data includes reporting touch on the at least one touched region if a user-interface element is within a threshold distance of the at least one touched region.

12. The method of claim 10 wherein computing the classified touch data includes reporting touch on the at least one touched region if the at least one touched region spans only one user-interface element.

13. The method of claim 10 wherein computing the classified touch data includes reporting touch on the at least one touched region if the at least one touched region vanishes within a predetermined time interval.

14. The method of claim 10 wherein computing the classified touch data includes reporting touch on the at least one touched region if the at least one touched region is located within a predetermined, input-receiving user-interface element and not reporting the touch if the at least one touched region is located outside of the predetermined, input-receiving user-interface element.

15. The method of claim 10 wherein computing the classified touch data includes reporting touch on the at least one touched region if no pen signal concurrent with the touch signal is received on the device.

16. The method of claim 10 wherein computing the classified touch data includes reporting touch on the at least one touched region if the at least one touched region is smaller than a user-interface element displayed in a same area as the at least one touched region.

17. The method of claim 10 wherein computing the classified touch data includes reporting touch on the at least one touched region if the at least one touched region is smaller than a spacing between adjacent user-interface elements displayed in a same area as the at least one touched region.

18. A handheld device comprising:
an electronic display;
a touch sensor arranged on the electronic display and including a plurality of crossings of row and column electrodes;
touch-sensor logic coupled operatively to the touch sensor and configured assemble a map of touch signal from the touch sensor, the map including a corresponding touch-signal value for each of the plurality of crossings, and defining at least one touched region of the touch sensor;
a context engine configured to gather and serve context data gathered from an application running on the device, wherein the context data is an indication of an environment in which the device is being used and is related to user-interface content currently presented on the electronic display, the context data including a layout of user-interface elements presented on the electronic display by the application running on the device and a distance of the at least one touched region from an edge of the electronic display; and
a touch-classifier system configured to compute classified touch data corresponding to the map of touch signal, wherein the touch-classifier system classifies the at least one touched region as a valid touch input or an invalid touch input based at least partly on whether the distance of the touched region from the edge of the electronic display is within a threshold distance, and wherein the threshold distance is variable based at least in part on gathered context data, and
wherein the touch-classifier system is further configured to report the classified touch data to an operating system of the handheld device.

19. The handheld device of claim 18 wherein the touch-classifier system includes a firmware engine executing on a dedicated touch-processor chip of the touch-sensor logic.

20. The handheld device of claim 18 wherein the touch-classifier system includes a software engine executing on a processor of the handheld device.

* * * * *